US009924340B1

(12) United States Patent
Ren et al.

(10) Patent No.: US 9,924,340 B1
(45) Date of Patent: Mar. 20, 2018

(54) TOLL-FREE DATA FOR A TARGETED GEOGRAPHIC REGION

(71) Applicant: Verizon Patent and Licensing Inc., Arlington, VA (US)

(72) Inventors: Dahai Ren, Lincoln, MA (US); Susan Kelly, Maynard, MA (US); Chunyan Du, Bedford, MA (US); Ming Chen, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/370,526

(22) Filed: Dec. 6, 2016

(51) Int. Cl.
| | |
|---|---|
| H04W 4/26 | (2009.01) |
| H04W 4/02 | (2018.01) |
| H04L 12/26 | (2006.01) |
| H04L 12/14 | (2006.01) |
| H04W 88/02 | (2009.01) |
| H04W 84/12 | (2009.01) |

(52) U.S. Cl.
CPC .......... H04W 4/26 (2013.01); H04L 12/1439 (2013.01); H04L 43/16 (2013.01); H04W 4/021 (2013.01); H04W 84/12 (2013.01); H04W 88/02 (2013.01)

(58) Field of Classification Search
CPC ..... H04W 4/021; H04W 4/023; H04W 4/025; H04W 4/026; H04W 4/028; H04W 8/00; H04W 4/02

USPC ....... 455/456, 1, 456.2, 456.3, 455.5, 455.6, 455/404.1, 404.2, 414.1
See application file for complete search history.

(56) References Cited

U.S. PATENT DOCUMENTS

| | | | |
|---|---|---|---|
| 9,516,174 B1 * | 12/2016 | Vishwanath | ...... H04M 15/8033 |
| 9,635,580 B2 * | 4/2017 | Sundaram | ........... H04L 41/5054 |
| 2012/0209753 A1 * | 8/2012 | Hodges | ................. H04L 12/146 705/30 |
| 2014/0188616 A1 * | 7/2014 | Badenhop | .......... G06Q 30/0267 705/14.58 |
| 2016/0057571 A1 * | 2/2016 | Florins | ................. H04W 4/021 455/456.3 |
| 2017/0154363 A1 * | 6/2017 | Dubey | ............... G06Q 30/0269 |

* cited by examiner

*Primary Examiner* — Jean Gelin

(57) ABSTRACT

A device may receive campaign information, that includes information identifying a targeted geographic region, for generating a toll-free data service campaign. The targeted geographic region may not coincide with a coverage area of a base station. The device may generate a campaign rule identifying one or more campaign conditions for updating an account of a campaign owner, associated with the toll-free data service campaign, for data used in association with the toll-free data service campaign. The device may receive a request, from a user device, to access a service, and may determine that one or more campaign conditions are satisfied, such as a condition to determine that the user device is located within the targeted geographic region. The device may provide an instruction to update the account, of the campaign owner, for data usage of the user device based on determining that the one or more campaign conditions are satisfied.

20 Claims, 9 Drawing Sheets

TOLL-FREE DATA FOR A TARGETED GEOGRAPHIC REGION

BACKGROUND

A toll-free telephone number may refer to a special telephone number that is free for the calling party, with the cost of the call instead being applied to an account of a party sponsoring the call. Similarly, a toll-free data service may refer to a network service where a network operator updates an account of a campaign owner that sponsors the toll-free data service, rather than updating an account of an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

In a Wi-Fi hotspot (e.g., a Wi-Fi hotspot at an airport, a Wi-Fi hotspot at a sporting event, etc.), a large quantity of user devices accessing high volumes of data may lead to network congestion. Network congestion on Wi-Fi may be relieved by allowing user devices to access toll-free data services via a wireless wide area network (e.g., a fifth generation (5G) network, a fourth generation (4G) network, a third generation (3G) network, etc.). In some cases, toll-free data may be provided over a large geographic region, like an entire country, a region served by a base station and/or packet data network (PDN) gateway (PGW), or the like. However, these techniques do not provide for targeted toll-free data services in a small geographic region (e.g., a store, a stadium, etc.).

Implementations described herein provide for targeted toll-free data sponsorship by allowing a campaign owner to sponsor toll-free data services in a targeted geographic region. In this way, sponsorship of toll-free data in the targeted geographic region reduces network congestion, improves overall customer satisfaction, and efficiently allocates network resources. Furthermore, the campaign owner may sponsor a toll-free data service in the targeted geographic region to attract customers to a venue located within the targeted geographic region.

FIGS. 1A-1D are diagrams of an overview of an example implementation 100 described herein. FIGS. 1A-1D show an example of generating, operating, and enforcing a toll-free data service campaign for a targeted geographic region.

Figure 1A:
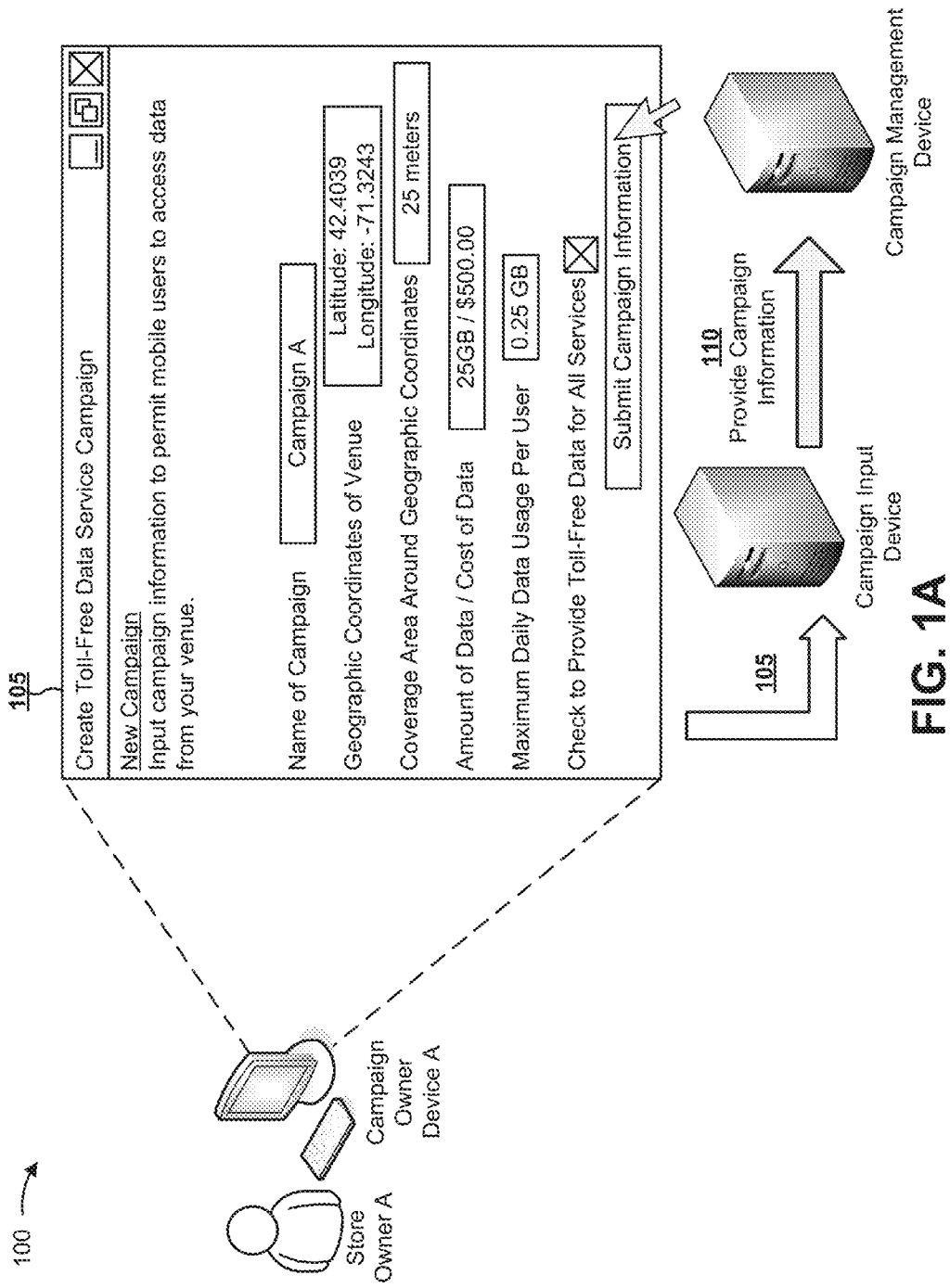
FIGS. 1A-1D are diagrams of an overview of an example implementation described herein.

As shown in FIG. 1A, and by reference number 105, a campaign owner (e.g., shown as store owner A) may use a campaign owner device (e.g., a computer) to access a portal (e.g., a web interface) hosted by a campaign input device (e.g., a server), and may input campaign information to create a toll-free data service campaign. As shown, store owner A may input a name of the campaign (e.g., a campaign identifier), shown as "Campaign A," a set of geographic coordinates of a venue associated with the campaign owner, shown as "Latitude: 42.4039" and "Longitude: −71:3243," a coverage area around the set of geographic coordinates, shown as "25 meters," an amount of data to be provided with the campaign, shown as "25 gigabytes (GB)," which corresponds to a payment of $500 by store owner A, a maximum daily data usage rate per user, shown as "0.25 GB," and an option to provide toll-free data for all services. Additionally, or alternatively, store owner A may input one or more uniform resource locators (URLs) if store owner A wants to sponsor data for a particular service. As shown by reference number 110, the campaign input device may send the campaign information to a campaign management device (e.g., a server).

Figure 1B:
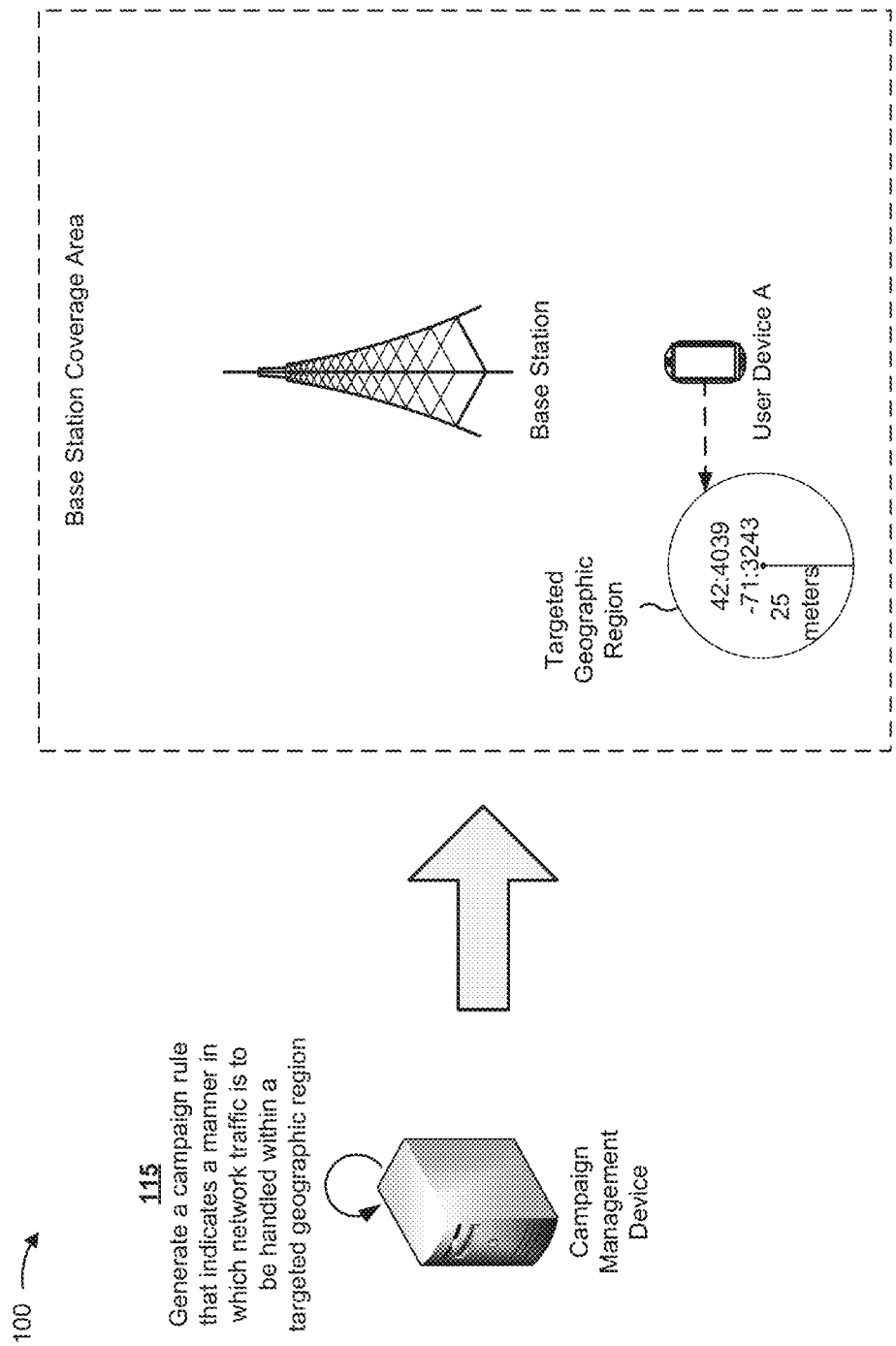

As shown in FIG. 1B, and by reference number 115, the campaign management device may generate a campaign rule that indicates a manner in which network traffic is to be handled within a targeted geographic region. The campaign rule may specify one or more campaign conditions for updating an account of a campaign owner for data used by a user device within the targeted geographic region. As shown, the targeted geographic region may be based on the set of geographic coordinates (and, in some cases, the coverage area around the set of geographic coordinates) input by the campaign owner (e.g., store owner A). In some implementations, the targeted geographic region may be smaller than a coverage area of a base station. In FIG. 1B, the targeted geographic region is shown as a circular area with a radius of 25 meters and a center at the coordinates specified by the campaign owner.

After generating the campaign rule for the targeted geographic region, a user accessing user device A (shown by a dotted arrow as walking toward the targeted geographic region) may request a service via a wireless wide area network (WWAN), and may be provided an offer to receive toll-free data in the targeted geographic region (e.g., by opting-in). As an example, to opt-in, the user accessing user device A may consent to allowing the location of user device A to be tracked, and the campaign management device may use the location of user device A to determine if user device A is within the targeted geographic region.

Figure 1C:
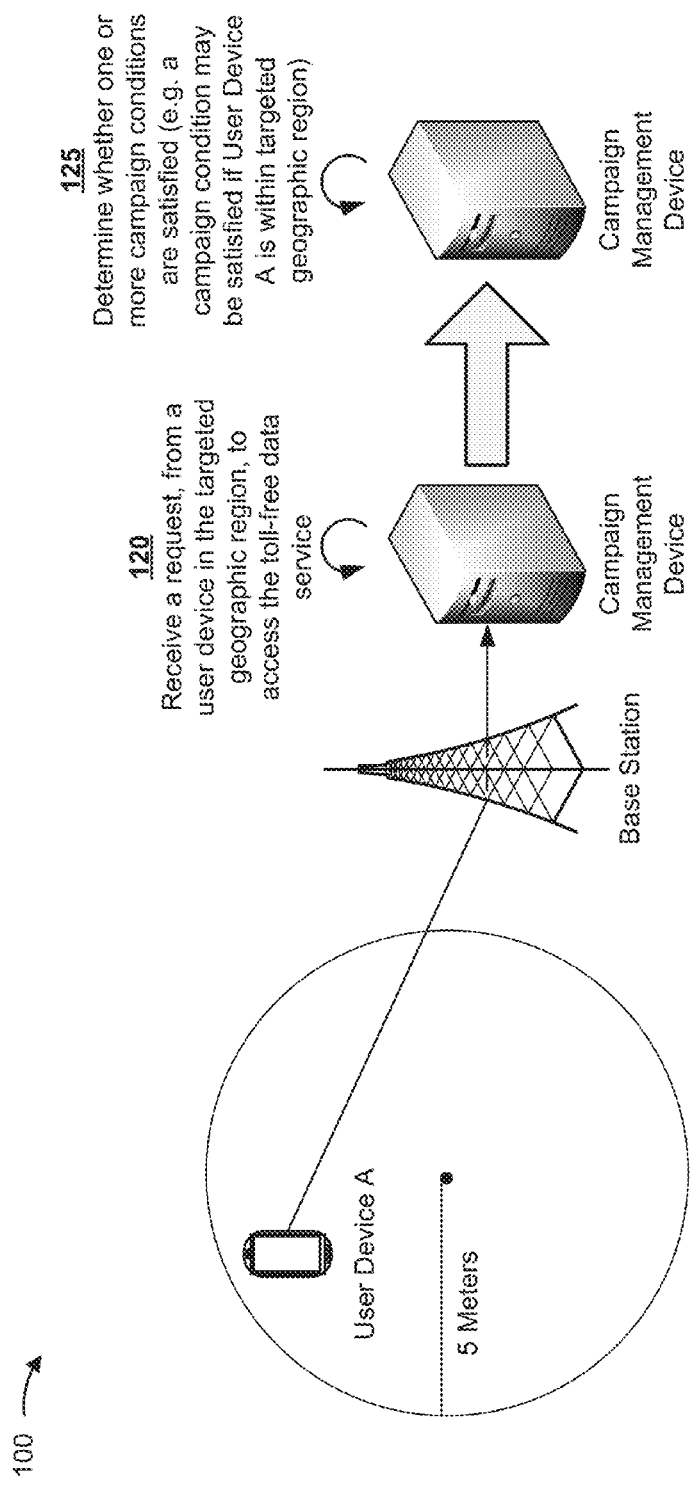

As shown in FIG. 1C, and by reference number 120, the campaign management device may receive a request, from a user device in the targeted geographic region (e.g., user device A), to access a network service. As shown by reference number 125, the campaign management device may determine whether one or more campaign conditions is satisfied. For example, the campaign management device may determine whether user device A is within the targeted geographic region. The campaign management device may, for example, compare a value indicating the location of user device A to a value or set of values indicating the targeted geographic region. If the one or more campaign conditions are satisfied, then the campaign management device may determine that the network service is a toll-free data service, and may update an account (e.g., charge the account) of a campaign owner for data usage associated with accessing and/or receiving the network service, as described below in FIG. 1D.

Figure 1D:
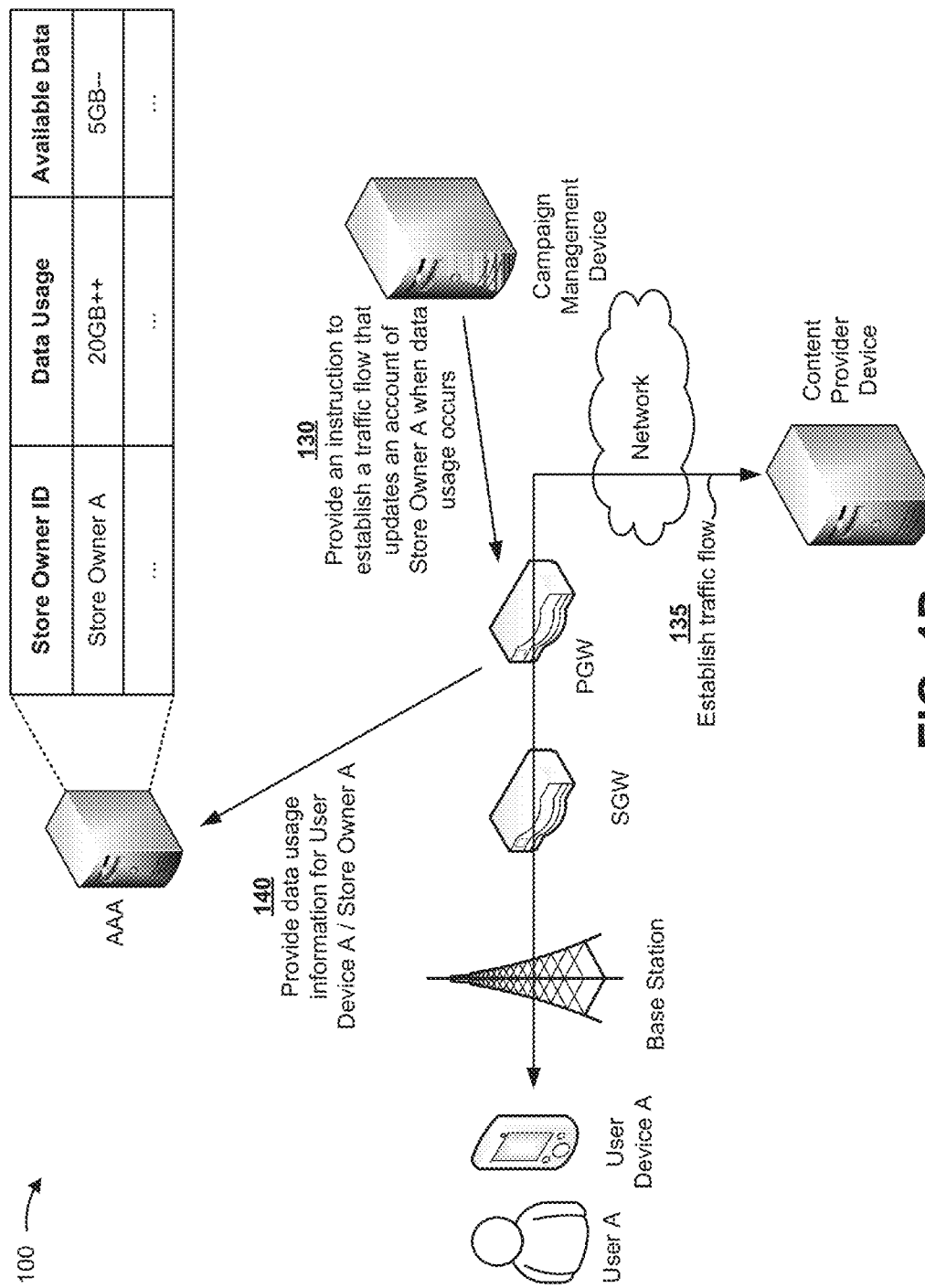

As shown in FIG. 1D, and by reference number 130, the campaign management device may provide, to the PGW, an instruction to establish a traffic flow that updates an account of the campaign owner (e.g., store owner A) when data usage occurs. As shown by reference number 135, the PGW may assist in establishing the traffic flow between user device A and a content provider device, such as a server that hosts a website, a video, audio, etc. being accessed by the user device. As shown by reference number 140, the PGW may provide data usage information, for the traffic flow between user device A and the content provider device, to an authentication, authorization, and accounting (AAA) server. Based on the data usage information received from the PGW, the AAA server may update accounting information for store owner A, which indicates a quantity of bytes used by user device A in association with the established traffic flow. In this way, the AAA server may update the account owned by store owner A for data usage when user device A uses a toll-free data service in the targeted geographic region.

By providing access to a toll-free data service in a targeted geographic region, the campaign management device allows a venue owner to attract prospective customers to the targeted geographic region in which the venue is located. Furthermore, providing access to the toll-free data service may encourage customers to access services via a WWAN instead of via a local Wi-Fi network (e.g., a network within the targeted geographic region), which may reduce congestion within the local Wi-Fi network. In addition, reducing congestion within the local Wi-Fi network and providing customers with a toll-free data service improves overall customer satisfaction.

As indicated above, FIGS. 1A-1D are provided merely as an example. Other examples are possible and may differ from what was described with regard to FIGS. 1A-1D. For example, a campaign owner may create a campaign with multiple targeted geographic regions and/or may sponsor toll-free data services associated with particular domains and/or URLs, rather than sponsoring all toll-free data services.

Figure 2:
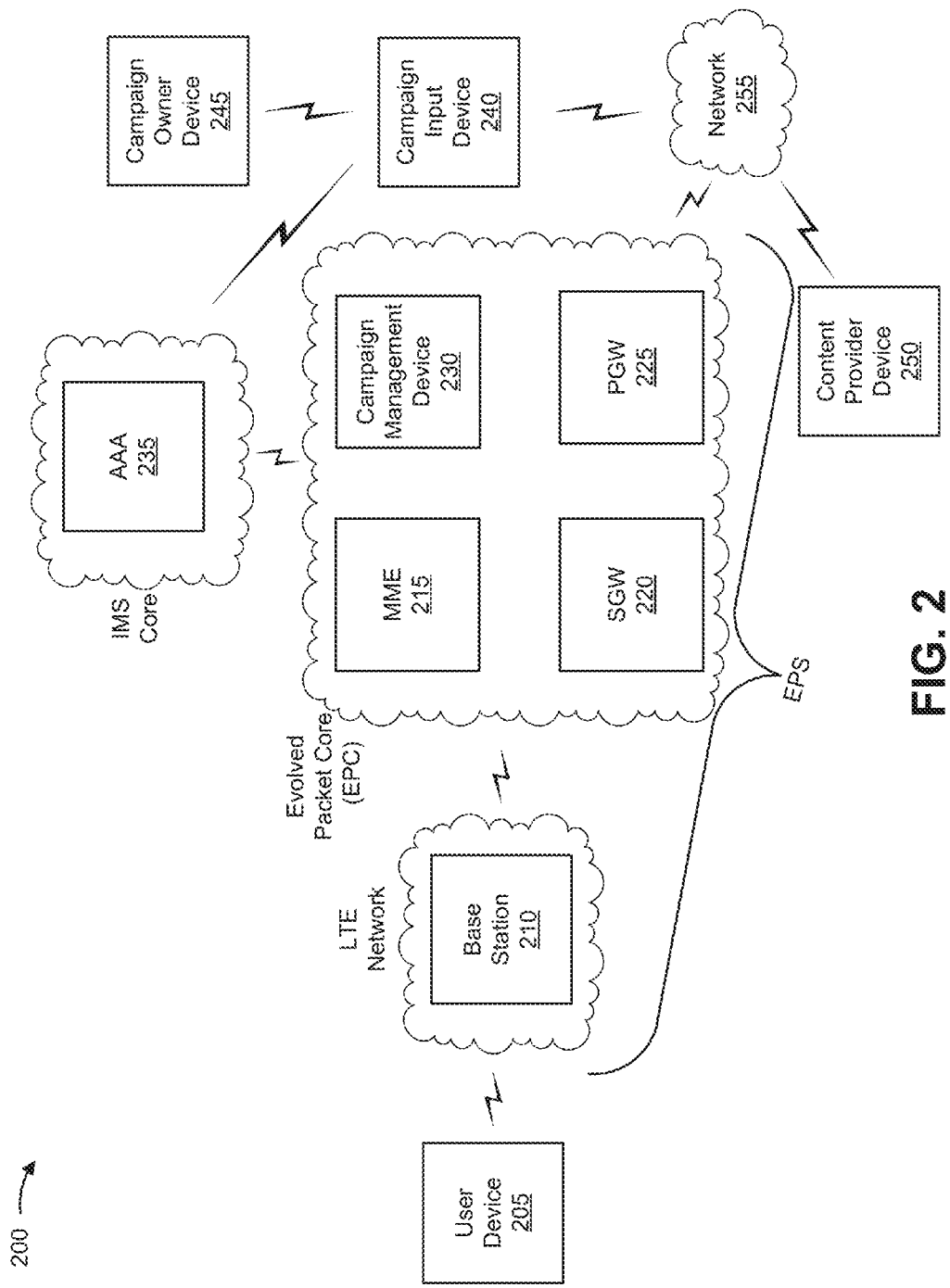
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a campaign management device 230, an authentication, authorization, and accounting server (AAA) 235, a campaign input device 240, a campaign owner device 245, a content provider device 250, and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a 5G network or a 3G network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user devices 205 communicate with the EPC. The EPC may include MME 215, SGW 220, PGW 225, and/or campaign management device 230 that enable user devices 205 to communicate with network 255 and/or an Internet protocol (IP) multimedia subsystem (IMS) core. The IMS core may include AAA 235, and may manage device registration and authentication, session initiation, campaign information, etc., associated with user devices 205 and/or content provider devices 250. AAA 235 may reside in the EPC and/or the IMS core.

User device 205 includes one or more devices capable of communicating with base station 210 and/or a network (e.g., network 255). For example, user device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a wearable computer (e.g., a smart watch, a smart band, a smart pair of eyeglasses, etc.), a personal gaming system, and/or a similar device. User device 205 may send traffic to and/or receive traffic from network 255 (e.g., via base station 210, SGW 220, and/or PGW 225). In some implementations, user device 205 may opt-in to toll-free data eligibility by consenting to sending location information to campaign management device 230, or by consenting to allowing another device (e.g., a satellite, base station 210, campaign management device 230, a location monitoring server, etc.) to track the geographic location of user device 205.

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 includes one or more devices, such as one or more servers, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to user device 205 via SGW 220 and base station 210. PGW 225 may record data usage information (e.g., byte usage), and may provide the data usage information to AAA 235.

Campaign management device 230 includes one or more devices capable of receiving, storing, processing, monitoring, capturing, and/or providing information associated with a toll-free data service campaign (e.g., campaign information, campaign rules, etc.). For example, campaign management device 230 may include a server (e.g., a cloud server or a data center server), a gateway, a router, a modem, a switch, a firewall, a NIC, a hub, a bridge, an OADM, or a similar device. In some implementations, campaign management device 230 may receive campaign information from campaign input device 240, may generate a campaign rule based on the campaign information, and may apply the campaign rule to a targeted geographic region.

Additionally, or alternatively, campaign management device 230 may inspect traffic and apply one or more campaign rules to the traffic. In some implementations, campaign management device 230 may apply the campaign rules to traffic received from PGW 225, and may instruct PGW 225 how to handle the traffic based on the campaign rules. Additionally, or alternatively, campaign management device 230 may instruct AAA 235 to update an account for data usage associated with the traffic. In some implementations, different campaign management devices 230 may be associated with different cellular service areas.

AAA 235 includes one or more devices, such as one or more server devices, that perform authentication, authorization, and/or accounting operations for communication sessions associated with user device 205. For example, AAA 235 may store data usage information for user device 205, for a user associated with user device 205, for content provider device 250, for a content provider (e.g., that provides a toll-free data service), etc.

Campaign input device 240 includes one or more devices capable of receiving, generating, storing, processing, and/or providing information associated with a toll-free data service campaign. For example, campaign input device 240 may include a desktop computer, a laptop computer, a mobile phone, a server device, or a similar device. Campaign input device 240 may receive, from campaign owner device 245, input that identifies campaign information, and may provide the campaign information to campaign management device 230.

Campaign owner device 245 includes one or more devices capable of receiving, generating, storing, processing, and/or providing information associated with a toll-free data service campaign. For example, campaign owner device 245 may include a desktop computer, a laptop computer, a mobile phone, a server device, or a similar device. In some implementations, campaign owner device 245 may receive, from a network device such as PGW 225 or AAA 235, information indicating a request to update an account for data associated with a traffic flow.

Content provider device 250 includes one or more devices capable of providing content (e.g., to user device 205). For example, content provider device 250 may include a server device (e.g., a host server, a web server, an application server, a cloud server, etc.) or a similar device.

Network 255 includes one or more wired and/or wireless networks. For example, network 255 may include a cellular network (e.g., a 5G network, a 4G network such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
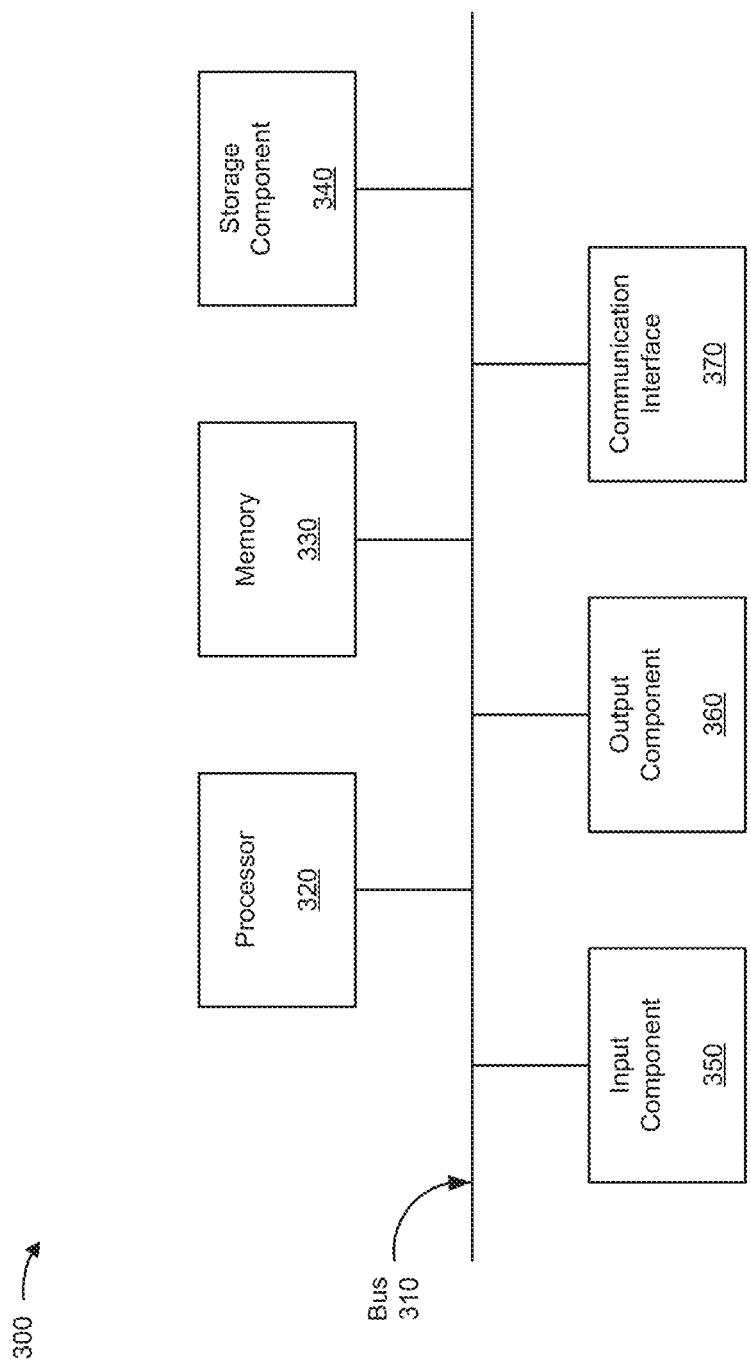
FIG. 3 is a diagram of example components of one or more devices of FIG. 2.

FIG. 3 is a diagram of example components of a device 300. Device 300 may correspond to user device 205, base station 210, MME 215, SGW 220, PGW 225, campaign management device 230, AAA 235, campaign input device 240, campaign owner device 245, and/or content provider device 250. In some implementations, user device 205, base station 210, MME 215, SGW 220, PGW 225, campaign management device 230, AAA 235, campaign input device 240, campaign owner device 245, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
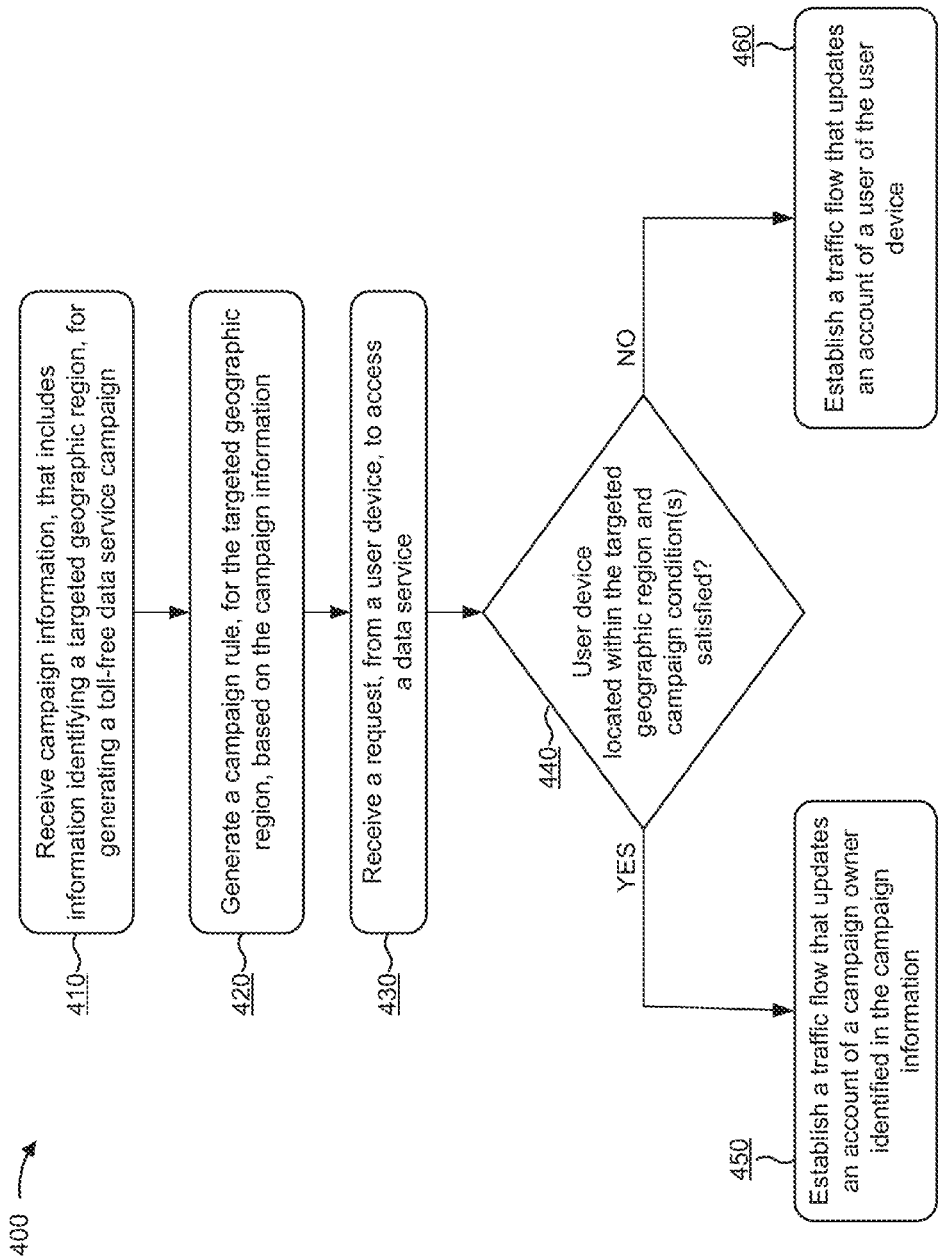
FIG. 4 is a flow chart of an example process for providing a toll-free data service to user devices in a targeted geographic region.

FIG. 4 is a flow chart of an example process 400 for providing a toll-free data service to user devices in a targeted geographic region. In some implementations, one or more process blocks of FIG. 4 may be performed by campaign management device 230. In some implementations, one or more process blocks of FIG. 4 may be performed by another device or a group of devices separate from or including campaign management device 230, such as user device 205, base station 210, MME 215, SGW 220, PGW 225, AAA 235, campaign input device 240, campaign owner device 245, and/or content provider device 250.

As shown in FIG. 4, process 400 may include receiving campaign information, that includes information identifying a targeted geographic region, for generating a toll-free data service campaign (block 410). A toll-free data service campaign (sometimes referred to herein as a campaign) may refer to a campaign by a campaign owner (e.g., a store owner, a venue owner, etc.) where the campaign owner agrees to sponsor a toll-free data service).

In some implementations, campaign management device 230 may receive campaign information that includes information that identifies the targeted geographic region associated with the campaign, such as information identifying a set of geographic coordinates and information identifying a distance from the set of geographic coordinates. For example, the set of geographic coordinates may include a longitudinal coordinate and a latitudinal coordinate, and the set of geographic coordinates may identify a center of the targeted geographic region. Further, the distance from the set of geographic coordinates may be used to determine an outer boundary of the targeted geographic region (e.g., a value of 25 meters may indicate a radius or a diameter, which may be used to determine a circular outer boundary). In some cases, the outer boundary of the targeted geographic region may be defined by using multiple sets of geographic coordinates (e.g., sets of geographic coordinates may represent corners in a targeted geographic region shaped as a rectangle, a square, or another polygon). In other cases, the outer boundary of the targeted geographic may be defined by allowing a user to draw or otherwise indicate, via a user interface, the targeted geographic region on a map provided for display via a user interface. For example, an interface may allow a user to indicate a particular shape by clicking and dragging a computer mouse, by using a utensil or a finger to make a particular shape on a touchscreen, or the like.

In some implementations, the targeted geographic region may not coincide with a coverage area of base station 210 (e.g., a micro cell base station, a macro cell base station, etc.), may be smaller than a coverage area of base station 210, may be smaller than a coverage area of PGW 225, may be less than a square kilometer, may be less than 100 square meters, may be less than 25 square meters, may be less than 10 square meters, or the like. In some cases, a campaign may include multiple targeted geographic regions. For example, an area associated with a targeted geographic region may be fixed, but may be smaller than the geographic location that a campaign owner needs to sponsor. In this case, the campaign owner may use multiple connecting targeted geographic regions to sponsor a larger geographic location. By allowing the campaign owner to provide the targeted geographic region(s) in the campaign information, campaign management device 230 is able to provide a toll-free data service to customers that visit a store or a venue located within the targeted geographic region(s).

Additionally, or alternatively, campaign management device 230 may receive campaign information that includes information that identifies a campaign owner associated with a campaign (e.g., a campaign owner identifier, a campaign identifier, one or more campaign owner device identifiers, etc.), information that identifies one or more services associated with the campaign (e.g., a service identifier, such as a uniform resource locator (URL), a network address, a domain name, etc.), information that identifies a threshold amount of resources that a particular user may use in a given time period (e.g., a maximum amount of toll-free data per day), information that identifies a threshold amount of resources associated with the campaign (e.g., a maximum amount of toll-free data, a maximum budget that corresponds to the maximum amount of data, etc.), information that identifies a time period during which the campaign is valid (e.g., a campaign owner may indicate that a campaign is valid during business hours, such as from 9 am-6 pm, etc.), or the like.

In some implementations, a campaign owner may use campaign owner device 245 to input the campaign information to a portal (e.g., a web interface) hosted by campaign input device 240, and the campaign information may be sent from campaign input device 240 to campaign management device 230. For example, the campaign owner may create a new campaign by inputting campaign information to a web interface hosted by campaign input device 240. As an example, a campaign owner may input campaign information that identifies a targeted geographic region by inputting a set of geographic coordinates (e.g., that identifies a center of the targeted geographic region) and a radius or diameter of the targeted geographic region (e.g., that may be used to determine an outer boundary of the targeted geographic region).

As another example, a campaign owner may input campaign information that identifies the targeted geographic region by inputting multiple sets of geographic coordinates (e.g., three sets of geographic coordinates, four sets of geographic coordinates, etc.) that define an outer boundary of the targeted geographic region. As another example, a campaign owner may input campaign information that identifies the targeted geographic region by inputting a street address (e.g., a street address may be associated with a particular building or venue), and the street address may be used to determine the targeted geographic region (e.g., a street address may be associated with one or more sets of geographic coordinates that define the outer boundary of the building or venue associated with the street address). In this case, campaign management device 230 may use the street address as a search query for an Internet service (e.g., a map service) to obtain the one or more sets of geographic coordinates and/or the outer boundary of the targeted geographic region. In addition, the campaign owner may be prompted to confirm that the street address identifies the desired targeted geographic region. Additionally, or alternatively, the owner may input a name and/or an address of a business, and campaign management device 230 may use the name and/or address of the business as a search query for an Internet search to identify the business hours of the business. In some implementations, the campaign may be valid only during those business hours.

By allowing a campaign owner to define the targeted geographic region in different ways, campaign management device 230 may limit sponsorship of a toll-free data service to an area associated with a property owned, occupied, and/or managed by the campaign owner (e.g., a store). In this way, the campaign owner is able to create a campaign, in the targeted geographic region, that provides customers located inside of the targeted geographic region with a toll-free data service.

As further shown in FIG. 4, process 400 may include generating a campaign rule, for the targeted geographic region, based on the campaign information (block 420). For example, campaign management device 230 may generate a campaign rule that indicates a manner in which network traffic is to be handled within the targeted geographic region. The campaign rule may be stored by a data structure associated with campaign management device 230, and may be accessed when campaign management device 230 and/or PGW 225 receives network traffic, as described further herein.

In some implementations, the campaign rule may specify one or more campaign conditions for updating an account of a campaign owner for data used by user device 205 to access a toll-free data service. For example, the campaign rule may specify one or more campaign conditions that, if satisfied, permit the account of the campaign owner to be updated for data usage associated with the toll-free data service.

As an example, the campaign rule may include four campaign conditions, and an account of a campaign owner may be updated when the four campaign conditions are satisfied. In this case, a campaign condition may be used to verify (or determine) that user device 205 is located within the targeted geographic region (e.g., indicated in the campaign information), and the campaign condition may be satisfied if user device 205 is located within the targeted geographic region. Another campaign condition may be used to verify that user device 205 is accessing and/or using a toll-free data service (e.g., by accessing a particular domain and/or URL included in the campaign information), and the campaign condition may be satisfied if user device 205 is accessing and/or using the toll-free service. For example, the campaign owner may sponsor a particular service, and the campaign condition may be satisfied if user device 205 is accessing the particular service. Alternatively, the campaign owner may sponsor all data services, and the campaign condition may be satisfied if user device 205 is accessing any data service (e.g., whether associated with the campaign owner or associated with a party independent of the campaign owner).

Furthermore, another campaign condition may be used to verify that user device 205 uses a threshold amount of resources in a given time period (e.g., a maximum amount of data per day), and the campaign condition may be satisfied if user device 205 has used less than the threshold amount of resources. Another campaign condition may verify that the total amount of resources used during the campaign (e.g., by one or more user devices 205 using the toll-free service) is below a threshold amount of resources reserved for the campaign (e.g., a maximum amount of toll-free data available for the campaign). Additionally, or alternatively, a campaign condition may be used to verify that user device 205 is accessing a data service during a time period indicated by the campaign owner in the campaign information (e.g., during business hours).

In some implementations, campaign management device 230 may provide an offer, to user device 205, to receive a toll-free data service (e.g., in the targeted geographic region), if a user of user device 205 agrees to opt-in. To opt-in, the user of user device 205 may accept an offer indicating that the toll-free data service may be provided in exchange for allowing the geographic location of user device 205 to be tracked. In some implementations, this tracking may be limited to a particular amount of time or may be limited within the targeted geographic region. For example, campaign management device 230 (or a different device that communicates with campaign management device 230, such as a location monitoring device) may track the geographic location of user device 205 by using global positioning system (GPS) tracking, by using triangulation or multi-angulation methods, or the like. In this way, a user that opts-in may receive toll-free data services within the targeted geographic region.

As further shown in FIG. 4, process 400 may include receiving a request, from a user device, to access a data service (block 430). For example, campaign management device 230 may receive, from user device 205 (e.g., via PGW 225), a request to access a data service. The request may include, for example, a Hypertext Transfer Protocol (HTTP) request, a File Transfer Protocol (FTP) request, an access request, etc. Campaign management device 230 may receive the request via a WWAN, and the request may identify a data service using a service identifier, such as a URL via which the data service is provided, a network address that identifies a device that provides the data service (e.g., content provider device 250), or the like.

As further shown in FIG. 4, process 400 may include determining whether the user device is located within the targeted geographic region and whether one or more campaign conditions, for providing the toll-free data service in the targeted geographic region, are satisfied (block 440). The one or more campaign conditions may be identified in the campaign rule, and the one or more campaign conditions may be used to determine an account of a party to update when data usage occurs in the targeted geographic region. For example, an account of a campaign owner may be updated if the one or more campaign conditions are satisfied, and an account of a user registered to user device 205 may be updated if the one or more campaign conditions are not satisfied.

In some implementations, campaign management device 230 may determine whether user device 205 is located within the targeted geographic region. For example, campaign management device 230, or another device that communicates with campaign management device 230 (e.g., user device 205, base station 210, a satellite, etc.), may obtain information identifying the geographic location of user device 205 (e.g., by tracking the geographic location of user device 205). In this case, campaign management device 230 may determine whether user device 205 is within the targeted geographic region by comparing information identifying the geographic location of user device 205 and the campaign information identifying the targeted geographic region. Additionally, or alternatively, campaign management device 230 may periodically determine (and/or re-determine) the geographic location of user device 205 during intervals (e.g., an interval of thirty seconds, an interval of sixty seconds, etc.) to determine whether user device 205 remains within the targeted geographic region.

In some cases, while determining whether user device 205 is within the targeted geographic region, campaign management device 230 may determine that user device 205 is within a threshold proximity of two different targeted geographic regions (e.g., a first targeted geographic region and a second targeted geographic region). The first targeted geographic region may be associated with a first campaign owner and the second targeted geographic region may be associated with a second campaign owner. In this case, campaign management device 230 may determine that user device 205 is located within a particular targeted geographic region (e.g., the first targeted geographic region or the second targeted geographic region), of the two different targeted geographic regions, by comparing the location of user device 205 to a data structure of geographic coordinates that indicate the outer boundaries of the first targeted geographic region and the second targeted geographic region. As a result, and as described further herein, when data usage occurs, campaign management device 230 may selectively provide an instruction to update an account, of the first campaign owner, or may update an account associated with the second campaign owner, based on determining that the user device is located within the first targeted geographic region or the second targeted geographic region.

As an example, a data structure associated with a first targeted geographic region and a second targeted geographic region may include a matrix of geographic coordinates that indicate the outer boundaries of each respective geographic region. Campaign management device 230 may compare geographic coordinates associated with the location of user device 205 to the stored matrix of geographic coordinates to determine if user device 205 is located within the first targeted geographic region or the second targeted geographic region. In this way, campaign management device 230 is able to provide a toll-free data service to a targeted geographic region without mistakenly updating an account of a campaign owner associated with a different nearby targeted geographic region.

In some implementations, when campaign conditions for multiple campaigns, associated with different campaign owners, are satisfied, campaign management device 230 may determine which of the campaign owners is to be a sponsor for the data usage. In this case, campaign management device 230 may determine the sponsor based on comparing distances of user device 205 to center areas of the multiple campaigns. For example, the campaign information may indicate a center area (e.g., a center of a circular area) of a targeted geographic region in which the campaign is valid. In this case, campaign management device 230 may determine the sponsor based on comparing a first distance, between user device 205 and a first center area of a first targeted geographic region of a first campaign, and a second distance between user device 205 and a second center area of a second targeted geographic region of a second campaign. Campaign management device 205 may use the smaller distance to identify the campaign owner that is to sponsor data usage of user device 205 and/or to identify the campaign associated with the data usage.

Additionally, or alternatively, the campaign information may identify a center for the targeted geographic region and a radius for the targeted geographic region. In this case, campaign management device 230 may determine a ratio between the distance from user device 205 to the center (e.g., d) and the radius (e.g., r), and may use the smaller ratio to identify the campaign owner that is to sponsor data usage of user device 205 and/or to identify the campaign associated with the data usage (e.g., the campaign with the smaller ratio of d/r).

Additionally, or alternatively, campaign management device 230 may determine whether the service identifier received from user device 205 is associated with a toll-free data service. For example, campaign management device 230 may compare the service identifier received from user device 205 to a stored service identifier marked as being associated with a toll-free data service. If the received service identifier matches the stored service identifier, then campaign management device 230 may determine that the data service is a toll-free data service. If the received service identifier does not match the stored service identifier, then campaign enforcement device 230 may determine that the data service is not a toll-free data service.

Additionally, or alternatively, campaign management device 230 may determine whether user device 205 has used fewer than a threshold amount of resources in association with the toll-free data campaign (e.g., in a particular period of time). For example, the campaign condition may indicate a maximum daily or weekly amount of resources (e.g., bytes of data) reserved for individual user devices 205. In this case, campaign management device 230 may monitor resources used by user device 205 in association with a toll-free data service, and the campaign condition may be satisfied if user device 205 has used fewer than the threshold amount of resources.

Additionally, or alternatively, campaign management device 230 may determine whether the total amount of resources used during a campaign has exceeded a threshold amount of resources reserved for the campaign. For example, the campaign condition may indicate a maximum amount of resources reserved for the campaign. In this case, campaign management device 230 may monitor resources used by user devices 205 within the targeted geographic region. When user devices 205 use a resource (e.g., bytes of data), the resource may be added to a total resources count, and the total resources count may be compared to the threshold amount of resources reserved for the campaign to determine whether this campaign condition is satisfied. In this way, campaign management device 230 efficiently allocates network resources by using campaign conditions to determine an appropriate account to update for data usage within the targeted geographic region (e.g., an account of a campaign owner or an account of a user).

Additionally, or alternatively, campaign management device 230 may determine whether a time at which user device 205 requests the service is within a valid time period for toll-free data service. The valid time period may be indicated in the campaign information, may be identified by performing a search for business hours associated with a business, may be set to default business hours (e.g., based on a time zone of the business), and/or the like.

As further shown in FIG. 4, if the one or more campaign conditions are satisfied (block 440—YES), then process 400 may establish a traffic flow that updates an account of a campaign owner identified in the campaign information (block 450). For example, campaign management device 230 may provide an instruction to PGW 225 to establish a traffic flow that updates the account of the campaign owner for data usage of the user device, based on determining that the one or more campaign conditions are satisfied. In this case, PGW 225 may route traffic (e.g., packets) associated with the requested service, may count an amount of data (e.g., in bytes) used in association with the requested service, and/or may provide data usage information (e.g., that identifies an amount of data used) to AAA 235. Additionally, or alternatively, campaign management device 230 and/or PGW 225 may provide an instruction, to AAA 235, that causes that data usage information to be sent to update the account of the campaign owner.

As an example, assume user device 205 is accessing a toll-free data service within the targeted geographic region, that user device 205 has not exceeded a daily threshold amount of resources reserved per user device 205, that a total amount of resources reserved for a campaign has not been exceeded, and/or that the user device 205 requests the data service during a valid time period associated with the campaign. Due to the campaign conditions being satisfied, campaign management device 230 may establish a traffic flow that updates an account of a campaign owner when data usage occurs.

Additionally, or alternatively, campaign management device 230 may determine that one or more campaign conditions are satisfied, may establish a traffic flow that updates an account of a campaign owner, may subsequently determine that one or more of the campaign conditions are no longer satisfied, and may establish a different traffic flow and/or may update an account of a user registered to user device 205 for subsequent data usage. As an example, assume that campaign management device 230 receives information identifying a geographic location of user device 205 and determines that user device 205 is located within the targeted geographic region. As a result, when data usage occurs, campaign management device 230 may establish a traffic flow that updates an account of the campaign owner. During a subsequent time period, campaign management device 230 may receive information identifying a different location of user device 205 and may determine that user device 205 is not located within the targeted geographic region. As a result, when subsequent data usage occurs, campaign management device 230 may establish a different traffic flow and/or may update an account of a user registered to user device 205.

As further shown in FIG. 4, if the one or more campaign conditions are not satisfied (block 440—NO), then process 400 may establish a traffic flow that updates an account of a user of the user device (block 460). For example, if campaign management device 230 determines that one or more of the campaign conditions are not satisfied, then campaign management device 230 may establish a traffic flow that, when data usage occurs, updates an account of a user registered to user device 205 (e.g., in the same manner described above, using PGW 225 and/or AAA 235).

As an example, assume that user device 205 is requesting a data service outside of the targeted geographic region. In this case, campaign management device 230 may establish a traffic flow that updates an account of the user registered to user device 205 for data usage associated with the requested service. Additionally, or alternatively, assume that user device 205 is requesting the data service outside of a valid time period associated with the campaign. In this case, campaign management device 230 may establish a traffic flow that updates an account of the user registered to user device 205 for data usage associated with the requested service.

As another example, assume that user device 205 is accessing a data service inside the targeted geographic region. However, campaign management device 230 may determine that the service identifier associated with the data service is not a toll-free data service (e.g., a campaign owner may sponsor a particular data service, and the user, while inside the targeted geographic region, may be accessing a different data service). In this case, campaign management device 230 may establish a traffic flow that updates an account of the user registered to user device 205 for data usage associated with the requested service.

Additionally, or alternatively, campaign management device 230 may determine that one or more of the campaign conditions are not satisfied, may establish a traffic flow that updates an account of a user registered to user device 205, may subsequently determine that the one or more of the campaign conditions are now satisfied, and may establish a different traffic flow and/or may update an account of a campaign owner for subsequent data usage. As an example, assume that campaign management device 230 receives information identifying a geographic location of user device 205 and determines that user device 205 is located outside of the targeted geographic region. As a result, when data usage occurs, campaign management device 230 may establish a traffic flow that updates an account of a user registered to user device 205. During a subsequent time period, campaign management device 230 may receive information identifying a different location of user device 205 and may determine that user device 205 is located within the targeted geographic region. As a result, when subsequent data usage occurs, campaign management device 230 may establish a different traffic flow and/or may update an account of a campaign owner associated with the targeted geographic region.

Additionally, or alternatively, campaign management device 230 may provide a notification to a campaign owner indicating that data usage associated with the toll-free data service campaign has satisfied a threshold. For example, campaign management device 230 may provide a notification to campaign owner device 245 indicating that data usage associated with the campaign has exceeded a maximum amount of data (e.g., bytes of data). Furthermore, campaign management device 230 may provide an offer to the campaign owner to purchase additional data for the campaign.

Additionally, or alternatively, campaign management device 230 may provide a notification to a campaign owner indicating that data usage associated with a particular user device 205 has satisfied a threshold. For example, campaign management device 230 may provide a notification to campaign owner device 245 indicating that data usage associated with the particular user device 205 has exceeded a daily maximum amount of data. In addition, campaign management device 230 may provide a notification to user device 205, indicating that subsequent data usage is no longer be toll-free. Furthermore, campaign management device 230 may recommend to the campaign owner to raise or remove the daily maximum amount of data permitted to be consumed by the particular user device 205. In this way, campaign management device 230 may allow engaged customers to use more data than the amount ordinarily allocated as the daily maximum amount of data.

In this way, campaign management device 230 efficiently allocates network resources by establishing a traffic flow that updates an account of a particular party (e.g., a campaign owner, a user registered to user device 205, etc.) for data usage within the targeted geographic region.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
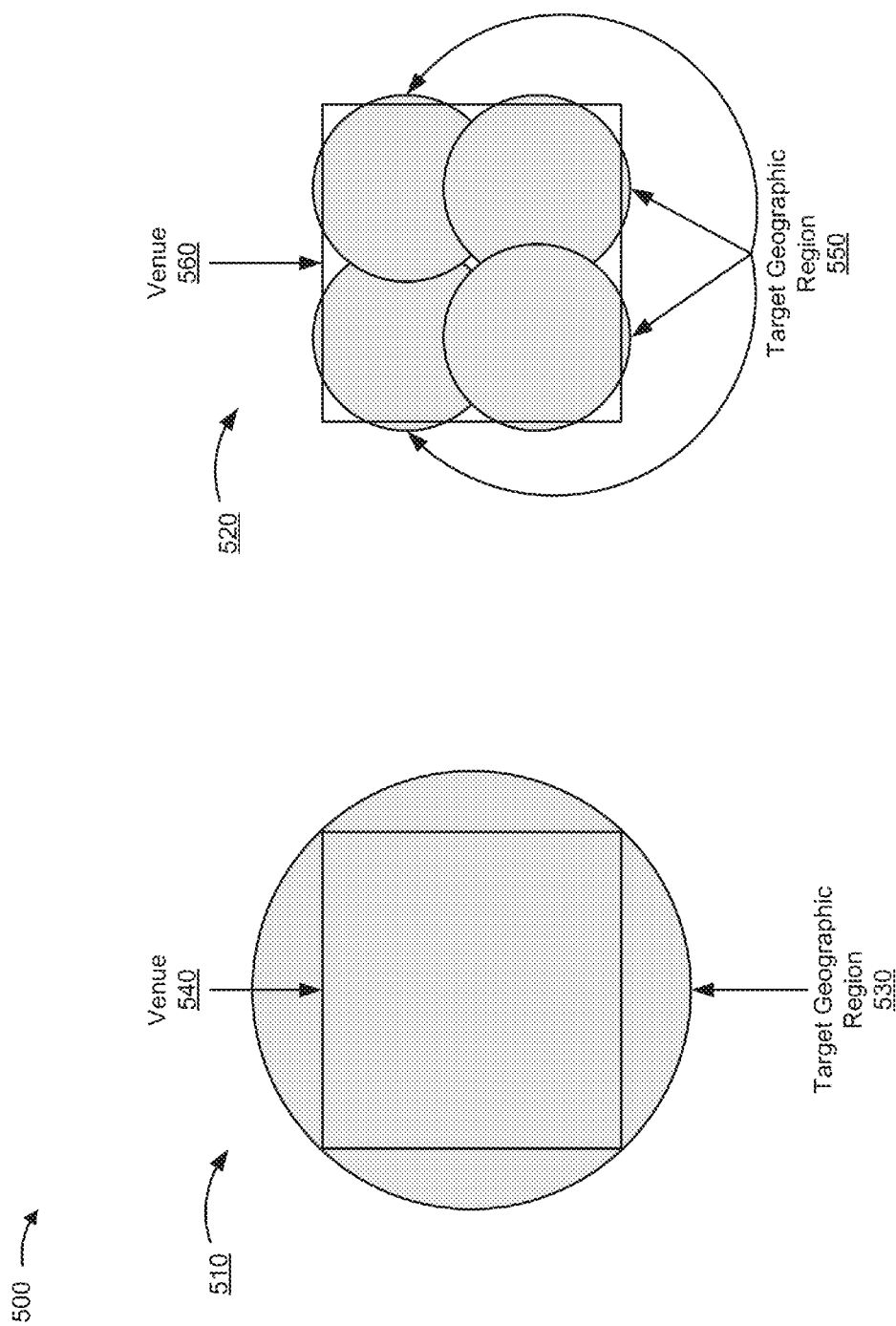
FIGS. 5A and 5B are diagrams of example implementations relating to systems and/or methods described herein.
Figure 5B:
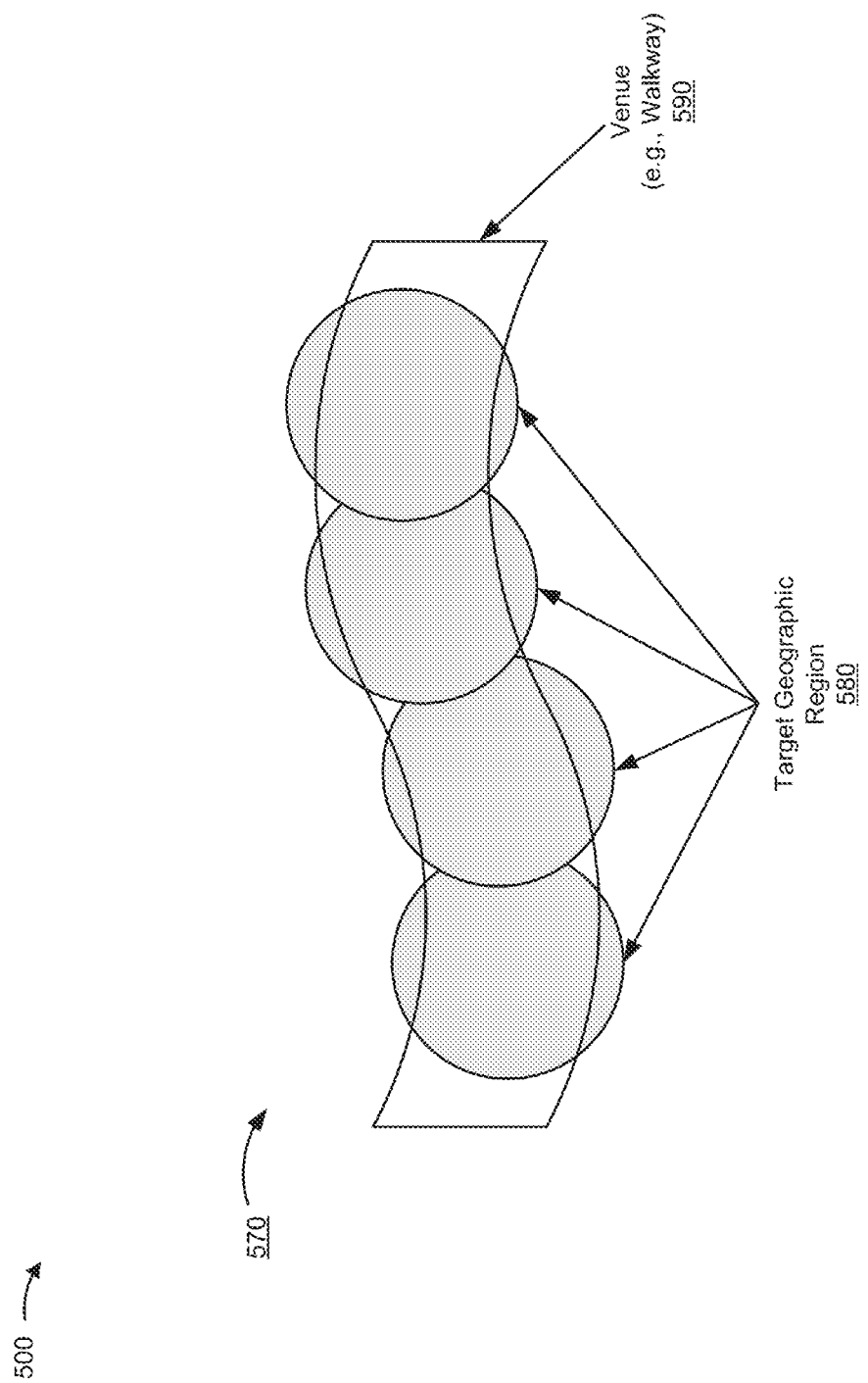

FIGS. 5A and 5B are diagrams of example implementations 500 relating to systems and/or methods described herein. FIGS. 5A and 5B show example targeted geographic regions associated with a toll-free data service campaign.

FIG. 5A shows a first configuration 510 for a targeted geographic region and a second configuration 520 for a targeted geographic region. The first configuration 510 uses a single area (e.g., shown as a single circle) to define a targeted geographic region 530 associated with a venue 540 (e.g., a store, a stadium, etc.). The single area may be specified in campaign information using, for example, a center and a radius (or a diameter). The second configuration 520 uses multiple areas (e.g., shown as four circles) to define a targeted geographic region 550 associated with a venue 560. The multiple areas may be specified in campaign information using, for example, multiple centers and multiple radii (or multiple diameters).

As shown for the first configuration 510, in some implementations, a campaign owner may specify the targeted geographic region 530 using a single area to ensure coverage throughout the entire venue 540. For example, the coverage is indicated in gray, and the first configuration 510 includes coverage for toll-free data services throughout the entire venue 540. However, this may cause the targeted geographic region 530 to extend past the boundaries of the venue 540.

As shown for the second configuration 520, in some implementations, a campaign owner may specify the targeted geographic region 550 using multiple areas to reduce coverage for toll-free data services outside the boundary of the venue 560. For example, the coverage is indicated in gray, the non-coverage is indicated in white, and the second configuration 520 includes coverage for toll-free data services most of the venue 560, while reducing a portion of the targeted geographic region 550 that extends beyond the boundaries of the venue 560.

FIG. 5B shows a third configuration 570 for a targeted geographic region. The third configuration 570 uses multiple areas (e.g., shown as four circles) to define a targeted geographic region 580 associated with a venue 590, such as a walkway, a sidewalk, a street, or the like, which may be located in front of a store, a stadium, etc. owned by a campaign owner. The multiple areas may be specified in campaign information using, for example, multiple centers and multiple radii (or multiple diameters). In some implementations, the same campaign owner may be associated with each of the multiple areas. In some implementations, different campaign owners may be associated with different ones of the multiple areas. For example, four different store owners may sponsor data usage for a targeted geographic region located in front of the store owners' respective stores.

As indicated above, FIGS. 5A and 5B are provided as examples. Other examples are possible and may differ from what is described in connection with FIGS. 5A and 5B.

By allowing a campaign owner to sponsor a toll-free data service in a targeted geographic region, campaign management device 230 reduces network congestion, improves overall customer satisfaction, and efficiently allocates network resources. Furthermore, the campaign owner may sponsor a toll-free data service in the targeted geographic region to attract customers to a venue located within the targeted geographic region.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive campaign information, that includes information identifying a targeted geographic region, for generating a toll-free data service campaign,
   the targeted geographic region being specified by a campaign owner of the toll-free data service campaign and being smaller than a coverage area of a base station, and
   the targeted geographic region including a set of geographic coordinates;
   generate a campaign rule based on the campaign information,
   the campaign rule identifying one or more campaign conditions for updating an account of the campaign owner, associated with the toll-free data service campaign, for data used in association with the toll-free data service campaign;
   receive a request, from a user device, to access a service;
   determine that the one or more campaign conditions are satisfied,
   the one or more campaign conditions including a campaign condition used to verify that the user device is located within the targeted geographic region,
   the campaign condition including:
   obtaining information identifying a geographic location of the user device,
   comparing information identifying the set of geographic coordinates of the targeted geographic region and the information identifying the geographic location of the user device, and
   verifying that the user device is located within the targeted geographic region based on a result of the comparing; and
   provide an instruction to update the account, of the campaign owner, for data usage of the user device, based on determining that the one or more campaign conditions are satisfied.

2. The device of claim 1, where the one or more processors are further to:
   receive information identifying an outer boundary associated with the targeted geographic region; and
   where the one or more processors, when determining that the one or more campaign conditions are satisfied, are to:
   compare the information identifying the outer boundary and the information identifying the geographic location of the user device, and
   verify that the user device is located within the targeted geographic region based on a result of the comparing the information identifying the outer boundary and the information identifying the geographic location of the user device.

3. The device of claim 1, where the one or more processors, when receiving the campaign information that includes the information identifying the targeted geographic region, are to:
   receive information identifying a street address; and
   where the one or more processors, when determining that the one or more campaign conditions are satisfied, are to:
   determine that the user device is located within the targeted geographic region based on the street address and the information identifying the geographic location of the user device.

4. The device of claim 1, where the one or more processors are further to:
   obtain information identifying another geographic location of the user device after providing the instruction to update the account of the campaign owner for data usage of the user device;
   determine that the user device is not located within the targeted geographic region after providing the instruction to update the account of the campaign owner for data usage of the user device; and
   provide another instruction to update an account of a user registered to the user device, for subsequent data usage, based on determining that the user device is not located within the targeted geographic region.

5. The device of claim 1, where the one or more processors, when determining that the one or more campaign conditions are satisfied, are to:
  determine that the user device is within a threshold proximity of a first targeted geographic region and a second targeted geographic region,
    the first targeted geographic region being associated with a campaign owner and the second targeted geographic region being associated with a different campaign owner,
  determine that the user device is located within the first targeted geographic region or the second targeted geographic region; and
  where the one or more processors, when providing an instruction to update the account of the campaign owner, are to:
    selectively provide an instruction to update an account of the campaign owner, or to update an account of the different campaign owner, based on determining that the user device is located within the first targeted geographic region or the second targeted geographic region.

6. The device of claim 1, where the one or more processors are further to:
  receive information identifying an outer boundary associated with the targeted geographic region,
    the outer boundary of the targeted geographic region being defined via an interaction with the user device by a user of the user device.

7. The device of claim 1, where the campaign information includes at least one of:
  information that identifies the campaign owner associated with the campaign,
  information that identifies one or more services associated with the campaign,
  information that identifies a threshold amount of resources that a particular user device may use in a predetermined time period, or
  information that identifies a threshold amount of resources associated with the campaign.

8. A non-transitory computer-readable medium storing instructions, the instructions comprising:
  one or more instructions that, when executed by one or more processors, cause the one or more processors to:
    receive campaign information, that includes information identifying a targeted geographic region, for generating a toll-free data service campaign,
      the targeted geographic region not coinciding with a coverage area of a base station, and
      the targeted geographic region including a set of geographic coordinates;
    generate a campaign rule based on the campaign information,
      the campaign rule identifying one or more campaign conditions for updating an account of a campaign owner, associated with the toll-free data service campaign, for data used in association with the toll-free data service campaign;
    receive a request, from a user device, to access a data service;
    determine that the one or more campaign conditions are satisfied,
      the one or more campaign conditions including a campaign condition to determine that the user device is located within the targeted geographic region,
        the campaign condition including:
          obtaining information identifying a geographic location of the user device,
          comparing the information identifying the set of geographic coordinates of the targeted geographic region and the information identifying the geographic location of the user device, and
          verifying that the user device is located within the targeted geographic region based on a result of the comparing; and
    provide an instruction to update the account, of the campaign owner, for data usage of the user device, based on determining that the one or more campaign conditions are satisfied.

9. The non-transitory computer-readable medium of claim 8, where the one or more instructions, that cause the one or more processors to receive the campaign information that includes the information identifying the targeted geographic region, cause the one or more processors to:
  receive information identifying an outer boundary for the targeted geographic region; and
  where the one or more instructions, that cause the one or more processors to determine that the one or more campaign conditions are satisfied, cause the one or more processors to:
    determine that the user device is located within the targeted geographic region by comparing the information identifying the outer boundary and the information identifying the geographic location of the user device.

10. The non-transitory computer-readable medium of claim 8, where the one or more instructions, that cause the one or more processors to receive the campaign information that includes the information identifying the targeted geographic region, cause the one or more processors to:
  receive information identifying a street address; and
  where the one or more instructions, that cause the one or more processors to determine that the one or more campaign conditions are satisfied, cause the one or more processors to:
    determine that the user device is located within the targeted geographic region based on the street address and the information identifying the geographic location of the user device.

11. The non-transitory computer-readable medium of claim 8, where the one or more instructions, when executed by the one or more processors, further cause the one or more processors to:
  obtain information identifying another geographic location of the user device after providing the instruction to update the account of the campaign owner for data usage of the user device;
  determine that the user device is not located within the targeted geographic region after providing the instruction to update the account of the campaign owner for data usage of the user device; and
  provide another instruction to update an account of a user registered to the user device based on determining that the user device is not located within the targeted geographic region.

12. The non-transitory computer-readable medium of claim 8, where the one or more instructions, that cause the one or more processors to determine that the one or more campaign conditions are satisfied, cause the one or more processors to:
  determine that the user device is within a threshold proximity of two different targeted geographic regions, and determine that the user device is located within a particular targeted geographic region of the two different targeted geographic regions.

13. The non-transitory computer-readable medium of claim 8, where the one or more instructions, when executed by the one or more processors, further cause the one or more processors to:
    obtain, periodically, information identifying the geographic location of the user device, and
    determine that the user device is located within the targeted geographic region by comparing the information identifying the targeted geographic region and the periodically obtained information identifying the geographic location of the user device.

14. The non-transitory computer-readable medium of claim 8, where determining that the one or more campaign conditions are satisfied comprises:
    determining that the user device uses a threshold amount of resources in a predetermined time period.

15. A method, comprising:
    receiving, by a device, campaign information that includes information identifying a targeted geographic region for generating a toll-free data service campaign,
        the targeted geographic region being smaller than a coverage area of a base station, and
        the targeted geographic region including a set of geographic coordinates;
    generating, by the device, a campaign rule based on the campaign information,
        the campaign rule identifying one or more campaign conditions for updating an account of a campaign owner, associated with the toll-free data service campaign, for data used in association with the toll-free data service campaign;
    receiving, by the device, a request from a user device to access a service;
    determining, by the device, that the one or more campaign conditions are satisfied,
        the one or more campaign conditions including a campaign condition to determine that the user device is located within the targeted geographic region,
        the campaign condition including:
            obtaining information identifying a geographic location of the user device,
            comparing the information identifying the set of geographic coordinates of the targeted geographic region and the information identifying the geographic location of the user device, and
            verifying that the user device is located within the targeted geographic region based on a result of the comparing; and
    providing, by the device, an instruction to update an account, of the campaign owner, for usage of the user device, based on determining that the one or more campaign conditions are satisfied.

16. The method of claim 15, where receiving the campaign information that includes the information identifying the targeted geographic region comprises:
    receiving information identifying an outer boundary of the targeted geographic region; and
    where determining that the one or more campaign conditions are satisfied comprises:
        determining that the user device is located within the targeted geographic region by comparing the information identifying the targeted geographic region and the information identifying the outer boundary of the targeted geographic region.

17. The method of claim 15, further comprising:
    obtaining information identifying another geographic location of the user device after providing the instruction to update the account of the campaign owner for data usage of the user device;
    determining that the user device is not located within the targeted geographic region after providing the instruction to update the account of the campaign owner for data usage of the user device; and
    providing another instruction to update an account of a user of the user device, for subsequent data usage, based on determining that the user device is not located within the targeted geographic region.

18. The method of claim 15, where determining that the one or more campaign conditions are satisfied comprises:
    determining a time associated with the request from the user device;
    determining that the time is within a valid time period for the toll-free data service campaign; and
    determining that the one or more campaign conditions are satisfied based on determining that the time is within the valid time period.

19. The method of claim 15, where determining that the one or more campaign conditions are satisfied comprises:
    determining whether the user device uses a threshold amount of resources in a predetermined time period.

20. The method of claim 15, where receiving the campaign information that includes the information identifying the targeted geographic region comprises:
    receiving information identifying an outer boundary associated with the targeted geographic region,
        the outer boundary associated with the targeted geographic region being defined via an interaction with the user device by a user of the user device.

* * * * *